Feb. 25, 1964 J. MICHAL ETAL 3,122,612

COMMUNICATION CHANNEL SIGNALING ARRANGEMENT

Filed Dec. 6, 1960 2 Sheets-Sheet 1

INVENTORS J. MICHAL
R. O. RIPPERE
BY S. Turner
ATTORNEY

COMMUNICATION CHANNEL SIGNALING ARRANGEMENT

Filed Dec. 6, 1960 2 Sheets-Sheet 2

INVENTORS J. MICHAL
R.O. RIPPERE
BY [signature]
ATTORNEY

United States Patent Office 3,122,612
Patented Feb. 25, 1964

3,122,612
COMMUNICATION CHANNEL SIGNALING ARRANGEMENT

Joseph Michal, New Hyde Park, and Robert O. Rippere, Huntington, N.Y., assignors to Bell Telephone Laboratories, Incorporated, New York, N.Y., a corporation of New York Filed Dec. 6, 1960, Ser. No. 74,078
25 Claims. (Cl. 179—27)

Figure 1:
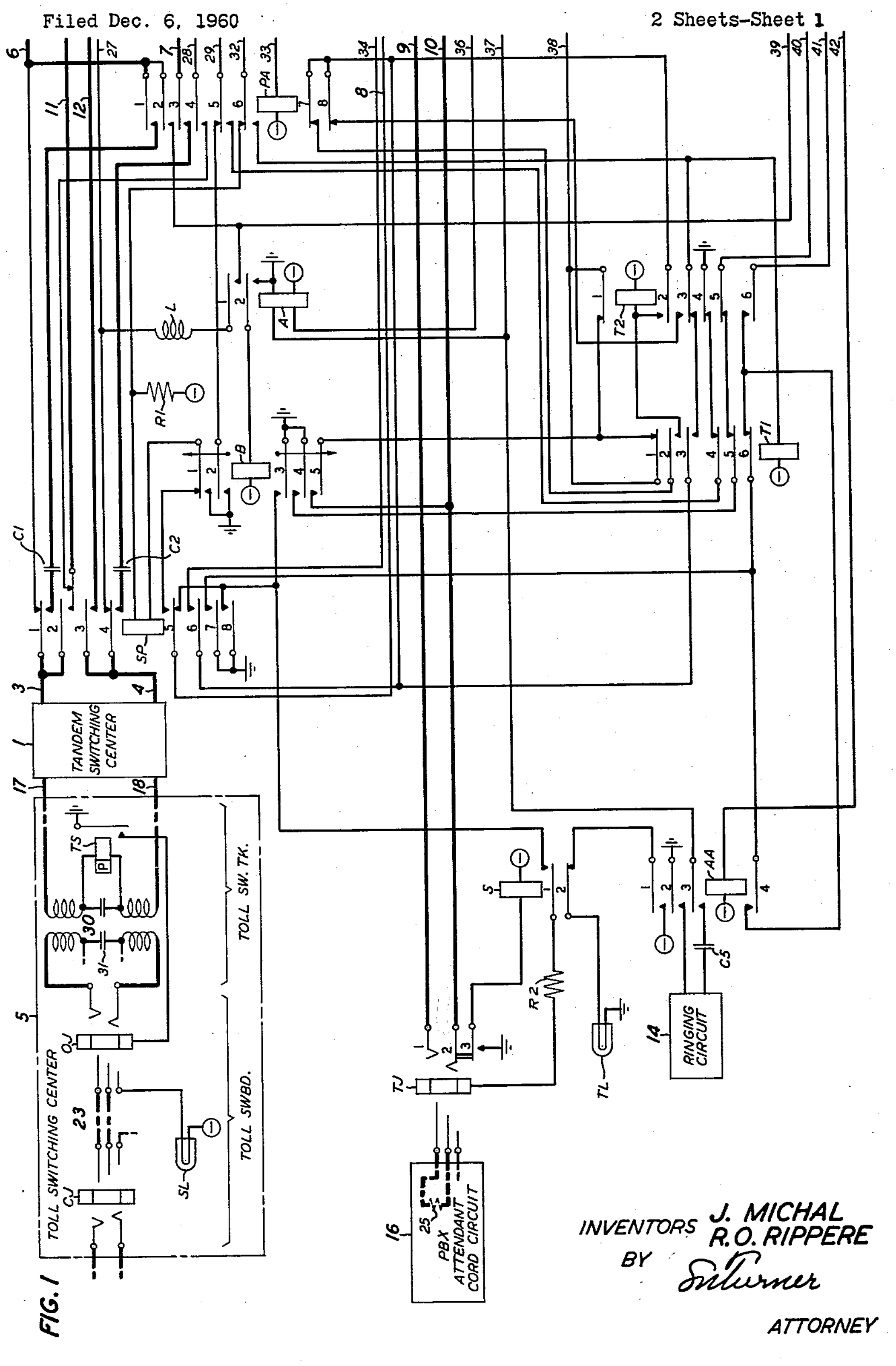

This invention relates generally to signaling circuitry, more particularly to telephone system signaling arrangements, and specifically to interexchange telephone trunks embodying novel circuitry for interexchange signaling.

The herein disclosed exemplary embodiment of the invention is an in-dialing telephone trunk circuit interconnecting a private branch exchange (PBX) and another (main) exchange, where the trunk appears before a PBX attendant's position, and in which trunk circuit novel signaling circuitry is provided whereby the attendant may signal over the trunk circuit to the main exchange. Whereas the invention may be readily used in other environments, as will be apparent to those skilled in the art, the telephone system embodiment will be referred to as an example of the utility of the invention.

In many situations, such as telephone practice, it is necessary to accomplish electrical signaling from one place to another over a communication or signaling channel. While there are many appropriate signaling techniques known in the art, such as multifrequency signaling, pulse code modulation, frequency modulation, amplitude modulation, strength and polarity of electrical voltages or currents, et cetera, each such technique involves changing parameters to convey information. A notable example of a signaling technique which has found extensive use in telephony is the well-known "reverse battery" signaling over the tip and ring conductors of a telephone circuit or communication line or trunk, etc.

The so-called "reverse battery" type of supervisory signaling used in telephony involves a source of energy, such as battery and ground potentials, and means for at times applying these potentials in one "normal" manner or sense (such as negative battery on the ring conductor and ground potential on the tip) to a telephone circuit for one purpose and for at times applying these potentials in another "off-normal" or "reverse" manner or sense (such as ground on the ring and battery on the tip) to the telephone circuit for another purpose. Means connected to the telephone circuit and selectively responsive to the "normal" or "off-normal" or "reverse" battery-ground signaling can be made effective to perform switching or supervisory control functions in accordance with these signals.

The general object of the present invention is to improve signaling control circuitry for applying signals of changing parameters to a signaling channel.

Another object of the invention is to provide simple and economical means for supplying energy to a telephone circuit and for signaling thereover.

Still another object of the invention is to provide energy supplying and signaling means as aforesaid, and which is monitored with respect to time.

In the hereinafter described telephone trunk environment of the inventive signaling arrangement, battery and ground are supplied from a bridged impedance battery feed relay in a trunk circuit toward a distant one of the trunk's termini. The battery and ground are fed toward the distant terminus aforesaid via the transfer contacts of two relays. One of these relays is directly controllable from an attendant position terminus of the trunk, and this relay in turn controls the other relay. These relays are operable and releasable in sequence through their four permutations of operated and released conditions, and are effective to maintain one battery and ground orientation toward the distant terminus as they assume the first three of their permutations, and to reverse this orientation during their assumption of the last of the four permutations. The duration of this latter condition is momentary and controlled in duration according to the slow-release characteristic of the said other relay. Correlative with the permutative sequence aforesaid is a timing arrangement which is activated by the said one relay to begin measuring a predetermined interval at the beginning of the third permutation of those aforesaid, and which is effective upon the failure of the two-relay signaling arrangement to advance to the fourth permutation within the predetermined interval, to disable that signaling arrangement.

A feature of the present invention whereby the foregoing general object is attained is the provision of a source of energy, two dual-condition circuit controlling elements, means for sequentially setting the two elements in their four permutations of conditions, and means controlled by said elements to apply energy to a signaling channel in a manner determined by the permutation then existent.

A more particular feature is the provision of battery and ground potentials, two operable and releasable relays, means for controlling the relays such that they are sequentially placed in their four permutative conditions of operation and release, in a definite order of such permutations, and circuits controlled by contacts of the relays for applying the potentials to a signaling channel in a manner or sense peculiar to each such permutative condition of said relays.

Another particular feature of the invention is a signaling arrangement in accordance with the preceding feature and wherewith is provided means for measuring a predetermined interval upon the assumption by the relays of one of their permutations, which means is effective upon the failure of those relays to assume a succeeding one of their permutations within that interval to interrupt their operating sequence.

An area of telephony where the present invention finds utility is in trunk circuits which interconnect exchanges, such as PBX's and larger switching centers, and wherein interexchange signaling needs to be mechanized under automatic or manual control.

PBX's serve groups of substations having an intimate community of interest and provide to parties at such substations a variety of special services not usually available to substation parties associated with only the general telephone switching system. Originally, PBX's were, to an extent greater than is considered advantageous today, mere appendages of the general switching system: calls to and from PBX extensions could not be made without PBX attendant assistance, and therefore centralized information, recording, billing, and toll facilities were not immediately available to PBX parties. It is now considered a great advantage from the standpoints of service and economy, to both telephone companies and substation parties, more fully to integrate PBX's and the substations served thereby into the general telephone switching network, thereby rendering more immediate service to PBX parties and reducing the work load of PBX attendants. An early development in this direction involved giving PBX parties direct access (usually by dialing "9") to trunks leading from the PBX to a nearby central office or tandem switching center. A more recent development is the provision of direct in-dialing facilities, whereby extra-PBX parties, including toll operators, may dial to control the PBX switch train directly, bypassing the PBX attendant. The advantages of providing such facilities will be apparent when it is considered that attendant extended calls take on the average 28 seconds longer to complete than direct-dialed calls, that such time represents "no charge" time on toll equipment in the case of "person-to-person" calls, and that, furthermore, subscribers are discouraged from using the modern, efficient station-to-station direct distance dialing (DDD) facilities on "station-to-station" calls when they may be charged upon reaching a PBX switchboard.

The provision of circuits arranged for in-dialing to PBX's cannot be made without considering the special needs of PBX parties, such as their need to be able to transfer calls among themselves. In trunk circuits arranged for call transfer, it is customary for the party desiring the transfer (the called PBX extension in the disclosed embodiment) to momentarily operate his switchhook, thereby briefly reversing battery and ground toward the incoming circuits as an indication that a transfer is desired. Since this signal is needed only locally, the reversal is not permitted to be extended back to the calling office; such extension of the reversal would have possible ill effects in that it might be interpreted as a disconnect signal at the latter office, or might recall a toll operator needlessly. Difficulty may arise, however, if the called party, while engaged on a call, wishes to contact the originating toll operator for some reason, such as to request a more noise-free connection. In the latter case, the very means which isolates the distant exchange from "request for transfer" reverse battery signaling will prevent such signaling from being employed to recall the distant toll operator.

Another object of the present invention is to improve the signaling circuitry of interexchange trunks.

Still another object of the present invention is to improve the signaling and energy supply circuits of interexchange trunks arranged for direct in-dialing and call transfer.

Yet another object of the invention is to provide an in-dialing trunk circuit arranged for call transfer via a local attendant position where the attendant can signal back toward the calling party at the behest of the local party called.

The herein disclosed embodiment of the invention shows a trunk circuit having appearances at a local exchange's switch train and attendant position and at a distant switching center. The trunk circuit is arranged to transmit dial pulses directly from the distant switching center to the local switch train; to provide answer supervision back toward the distant center; to disregard "switchhook fumbling;" to respond to a momentary on-hook operation by the called PBX party to light a trunk lamp at the PBX attendant position and to audibly signal the original parties that the attendant is being called; to provide a three-way talking connection among the answering attendant and the calling and called parties; to control disconnect supervision from the PBX according to timed intervals; and to enable the PBX attendant to signal a toll operator who may have originally set up an in-dialed call to a PBX extension.

When the PBX called party answers a call in-dialed over the subject trunk circuit, that circuit functions to supply talking battery to the calling end of the trunk. This talking battery is separate from that supplied the called party by his local switch train, and is connected to the calling trunk under the control of two relays. These relays, which comprise the previously referred to signaling control circuitry, are in turn controllable by the local PBX attendant who may, by repeatedly connecting her cord circuit to and disconnecting it from the switchboard appearance of the trunk circuit, signal out over the calling trunk. The two relays are operated through a four-stage cycle of their possible permutations of operation and release, and when they are momentarily both operated in the last stage of that cycle, the polarity of talking battery toward the calling party is reversed.

In the preferred mode of operation of the instant trunk, and in the situation wherein the PBX called party desires to communicate with the originating toll operator, the PBX attendant will enter the original connection in response to signaling by the called party; the attendant may then signal the toll operator by withdrawing and reinserting her answering cord plug in the trunk jack. It is desirable to distinguish, however, between cord plug withdrawal precedent to reinsertion for the purpose of signaling, and withdrawal when the PBX attendant disconnects permanently. This is achieved in the subject circuit by placing the relay signaling arrangement aforesaid under the control of a timing device in the trunk circuit, thus giving that device five functions: (1) distinguishing between called party switchhook fumble and answer, (2) delaying disconnect supervision from the PBX called party, (3) delaying disconnect supervision from the PBX attendant, (4) distinguishing between called party disconnect and request for transfer, and (5) distinguishing between attendant disconnect and attendant signaling to the toll operator. When the attendant withdraws her cord plug and fails to reinsert it within a prescribed interval, the timing device disables the relay signaling arrangement.

A feature of the instant invention is an in-dialing trunk circuit having novel supervisory and signaling arrangements.

Another feature of the invention is an in-dialing trunk circuit arranged for call transfer and having means therein whereby an originating toll operator may be signaled from the terminating exchange.

Yet another feature of the present invention is the provision in interexchange trunks of the foregoing relay signaling control circuitry whereby changing conditions in one exchange may be used to control the relay arrangement for applying battery-ground signals over the trunk to the other exchange.

A particular feature of the present invention is the provision in such a trunk of the aforementioned relay signaling arrangement under the control of the subsidiary exchange attendant whereby "reverse battery" signaling can be effectuated from the trunk toward the main exchange and whereby manipulation of the attendant's telephone circuit controls the sequential permutative condition of the relay circuitry.

Still another feature of the invention is a relay signaling arrangement in a telephone circuit, the relays being adapted to supply energy to the telephone circuit in a first manner, and being operable over a four-stage cycle to supply energy to the telephone circuit in a second manner during the fourth stage of that cycle.

A further feature of the present invention is the added provision with the aforementioned relay signaling circuitry in a trunk circuit of a timing arrangement for monitoring the manipulations of the attendant's apparatus and for disabling the signaling circuitry whenever such manipulations fail to cause such relay permutations to occur sufficiently promptly in sequence.

Another particular feature of the present invention is the provision of a main exchange-to-subsidiary (such as a private branch exchange —PBX) exchange trunk having an attendant terminus in the PBX and arranged to provide direct in-dialing access to the PBX and to enable call-transfer through the agency of the attendant's position, the trunk including the aforementioned dual relay arrangement under the control of attendant apparatus to enable the attendant to effectuate "reverse battery" signaling to the main exchange.

Figure 2:
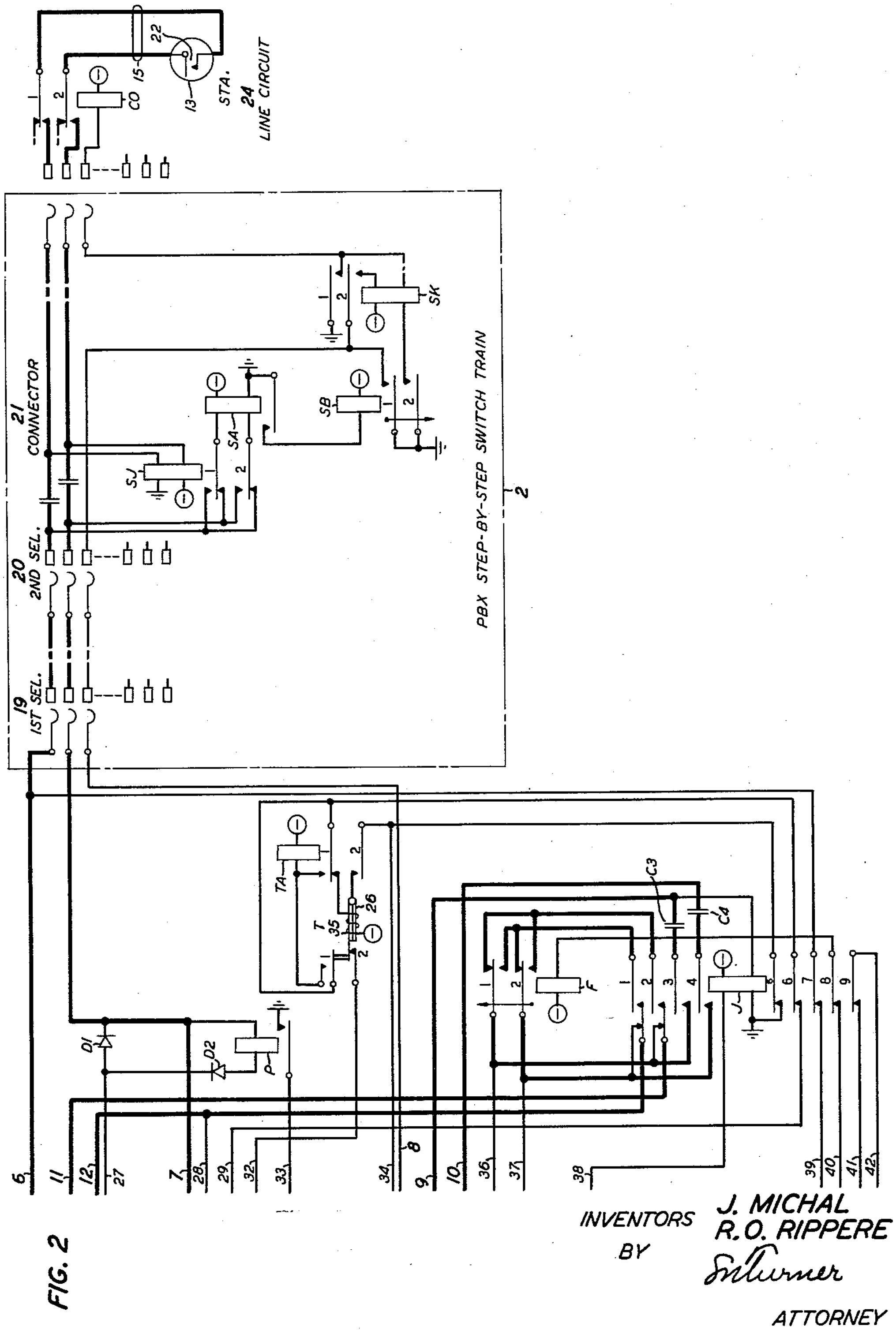

These and other objects and features of the present invention will appear and be more fully appreciated upon consideration of the hereinafter described exemplary embodiment thereof and the accompanying drawing, in which:

FIGS. 1 and 2 taken together, depict one specific illustrative embodiment of our invention, FIG. 1 showing a portion of a trunk circuit and its relation to a tandem switching center 1, a toll switching center 5, and a PBX attendant's cord circuit 16 and FIG. 2 showing the remainder of the trunk circuit and its relation to a PBX step-by-step switch train 2 and an associated line circuit 24.

It will be noted that the trunk circuit has three extensions, termini, or appearances: conductors 3 and 4 toward and at tandem switching center 1, conductors 6, 7, and 8 toward and at switch train 2, and conductors 9 and 10 toward and at PBX trunk jack TJ (FIG. 1). The latter trunk jack TJ is associated with the attendant position (not shown in full) of the PBX having switch train 2 and line circuit 24.

For the purpose of illustrating most clearly the toll operator recall feature of the invention, switching center 1 has been designated "tandem" and shown interposed between toll switching center 5 and the subject trunk circuit. However, the trunk is adapted to cooperate with any exchange, be it tandem, central, or branch, which is capable of seizing the trunk by bridging conductors 3 and 4, transmitting dial pulses to be conveyed by the trunk to switch train 2, and responding to the usual reverse-battery type of supervision. Also, it may be noted that toll facilities which are here shown separate from switching center 1 may in practice be located in and as a part of that center. A suitable tandem switching center may be such as that shown in A. J. Busch et al. Patent 2,587,817, March 4, 1952.

Toll switching center 5 provides for the extension of calls with operator assistance. Incoming calls are received by the operator at calling jack CJ of the toll switchboard, and are extended via outgoing trunk jack OJ over an outgoing toll switching trunk comprising conductors 17 and 18. Between the jacks CJ and OJ aforesaid is the toll operator's cord circuit 23, of which only the called-end supervisory lamp SL is fully shown. Other toll equipment such as keying and answering operator position equipment, outgoing senders, etc., are not shown as inessential to a complete understanding of the present invention, but an appreciation thereof may be had from considering the toll switching circuits shown in S. W. Allison Patent 2,868,886 of January 13, 1959. It will be noted that supervisory signaling to the toll operator from the called end (over conductors 17 and 18) of a connection she establishes is achieved by operating and releasing polar trunk supervisory relay TS according to the polarity of tip and ring trunk conductors 17 and 18; relay TS is operative to light and extinguish supervisory lamp SL when that lamp is connected via jack OJ.

PBX switch train 2 may be of any well-known type adapted to be controlled by dial pulses to automatically extend connections between line and trunk appearances therein, and arranged to generate the usual reverse-battery type of supervision. For example, and as indicated in FIG. 2, a step-by-step switch train may be employed in a PBX having four-digit extension numbers, the train comprising first or incoming selectors, second selectors, and connectors, the latter being effective to complete dialed calls to stations such as station 13 having line circuit 24.

PBX attendant's cord circuit 16, trunk jack TJ, and trunk lamp TL of FIG. 1 are associated with the attendant position (not fully shown) of the PBX having switch train 2 of FIG. 2. Other position equipment is not shown as being well known in the art and inessential to teaching the invention to those skilled in the art. For the sake of clarity of exposition, it has been assumed that a manual type of switchboard is to be used at the attendant position; this is no necessary limitation on the invention, however, and other types of attendant answering and call extension facilities may be used. For example, the cord circuit bridge, symbolized by resistor 25, is effective when placed across conductors 9 and 10 at trunk jack TJ to operate relay J (FIG. 2); instead of the plug-in jack connection, a switch might be placed in the resistor 25 loop to control the bridging of conductors 9 and 10.

Ringing circuit 14 may be of any of those well known to be employed in telephone systems.

The trunk circuit multifunctional timing arrangement of FIG. 2 comprises thermal relay T and its recycling auxiliary relay TA. The particular timing arrangement shown, whose operation will be described in due course, is merely illustrative since other suitable timing arrangements could as well be used.

For the purposes of this description, it is assumed that the well known reverse-battery type of supervision is to be used. All talking conductors, over which such supervision is generally passed, are described by heavy lines.

For the purposes of the immediately forthcoming portion of the description, an in-dialed call to station 13 of PBX switch train 2 may originate either at or beyond tandem switching center 1, the source of the call being insignificant until the toll operator recall aspect of the trunk circuit operation is considered later in the description.

*Seizure, Dialing, and Transmission*

In accordance with usual telephone practice, the subject trunk may be seized for an outgoing call from tandem switching center 1 by there bridging (the responsible apparatus not being shown here) tip and ring conductors 3 and 4. As is also usual, first selector 19 of switch train 2 will respond to the bridging aforesaid to place ground and battery on tip and ring conductors 6 and 7 to energize the trunk, and will also place ground on holding ("S") conductor 8. The apparatus in first selector 19 responsible for the energizing operations aforesaid is not shown, since it is well known in the art and, in addition, may be similar to the energizing apparatus shown in FIG. 2 for connector 21; that is, the bridging of conductors 6 and 7 may operate a bridged impedance battery feed relay in first selector 19 which is analogous to relay SA of connector 21, and a first selector 19 relay corresponding to relay SB of connector 21 may return ground on conductor 8. The trunk energizing circuit may be traced from battery at a relay (not shown) corresponding to relay SA in first selector 19 of switch train 2, via ring conductor 7, diode D1, conductor 27, break (normally closed) side of transfer contact 4 of splitting relay SP, ring conductor 4, the calling loop (not shown) at or beyond tandem center 1, tip conductor 3, break side of transfer contact 1 of relay SP, tip conductor 6, to ground at the aforesaid relay (not shown) in first selector 19 corresponding to relay SA of connector 21. This polarity condition of negative battery on a ring conductor (the ring conductors are conductors 4, 7, 12, 10, and 18) and ground on the associated tip conductor (the tip conductors are conductors 3, 6, 11, 9, and 17) will be referred to hereinafter as "normal" battery and ground; the reverse polarity condition will be referred to as "off-normal" battery and ground. It will be noted that "polar" relay P, being made polar by oppositely poled diodes D1 and D2, does not operate at this time since its series-connected diode D2 is reversely biased. In addition to the trunk energization aforesaid, first selector 19 may return ground on conductor 8 from a relay therein corresponding to relay SB of connector 21: circuit from ground (not shown) in first selector 19 to the break side of transfer contact 5 of relay SP via conductor 8. The trunk and switch train 2 are now in condition to receive dial pulses (to which diode D1 offers negligible resistance) corresponding to the extension number of the called party at station 13.

Receipt of the first digit of the extension number causes first selector 19 to extend conductors 6, 7, and 8 to second selector 20 in the well known manner; the latter selector then assumes the responsibility for supplying ground to conductors 6 and 8, and negative battery to conductor 7. Receipt of the second digit of the extension number causes second selector 20 to extend conductors 6, 7, and 8 to connector 21 in the well known manner. As shown, relay SA supplies normal battery and ground to conductors 6 and 7, and relay SB, operated upon the operation of relay SA in an obvious circuit, supplies ground to conductor 8 from its make contact 1, and thus holds the preceding selectors 19 and 20. The remaining two digits of the extension number of station 13 will cause connector 21 to advance, first vertically and then horizontally, to make contact with the connector 21 appearance of station line 15 of station 13, all in a manner well known in the art. When connector 21 has reached station line 15, the usual busy test will be made by equipment not shown, and, assuming line 15 to be unengaged, ringing will be applied to the line and relays CO and SK will be operated. The latter functions are performed in any well known manner by standard equipments whose absence is indicated by dotted lines. Relay CO operated completes the extension of conductors 6 and 7 to station 13; relay SK operated supplies ground from its make (normally open) contact 1 to maintain relay CO operated. Relays CO and SK remain operated for the duration of the connection under the immediate control of operated relay SB, which is in turn controlled by operated relay SA, which is in its turn ultimately controlled from the calling loop (not shown) at or beyond tandem switching center 1.

When the called party at station 13 responds to the ringing aforesaid to lift his receiver (not shown), station 13 thus changing from its "on-hook" to its "off-hook" condition, switchhook contact 22 will close to complete the loop offered by station line 15 engaged, and bridged impedance battery feed relay SJ will operate from that loop and supply normal battery and ground thereto. At the make sides of its transfer contacts 1 and 2, relay SJ operated also reverses the polarity of the connection of relay SA to conductors 6 and 7, so that relay SA now supplies off-normal battery and ground (the well known "answer supervision") back toward the calling end of the completed connection: circuit from negative battery at the upper winding of relay SA, make side of transfer contact 1 of relay SJ, selectors 20 and 19, tip conductor 6, break side of transfer contact 1 of relay SP, tip conductor 3, the calling loop (not shown), ring conductor 4, break side of transfer contact 4 of relay SP, conductor 27, diode D2, winding of relay P, ring conductor 7, selectors 19 and 20, make side of transfer contact 2 of relay SJ, and thence to ground at the lower winding of relay SA.

Relay P operates in the latter circuit, operating in turn polar auxiliary relay PA (FIG. 1) in an obvious circuit comprising conductor 33. Relay PA, in operating, (1) prepares at its make contacts 1 and 3 the principal talking path between switching center 1 and switch train 2 via capacitors C1 and C2; (2) prepares at its make contact 2 a circuit for connecting inductor L across conductors 6 and 7 toward switch train 2 as a local holding bridge for relay SA; (3) closes at the make side of its transfer contact 5 a circuit for beginning the operation of thermal timing relay T; (4) prepares at the make side of its transfer contact 6 a path for operating transfer relay T1; and (5) operates bridged impedance battery feed relay A in a circuit which may be traced from ground through the upper winding of relay A, over conductor 37, the break side of transfer contact 1 of relay J, ring conductor 12, conductor 28, make contact 4 of relay PA, break side of transfer contact 2 of relay SP, tip conductor 11, break side of transfer contact 2 of relay J, conductor 36, and through the lower winding of relay A to battery. At its make contact 1 relay A connects inductor L across conductors 6 and 7 toward switch train 2: circuit from ground at the lower winding of relay SA, make side of transfer contact 2 of relay SJ, selectors 20 and 19, ring conductor 7, winding of relay P, diode D2, conductor 27, inductor L, make contact 1 of relay A, make contact 2 of relay PA or conductor 39 and break contact 7 of relay J, tip conductor 6, selectors 19 and 20, make side of transfer contact 1 of relay SJ, to battery at the upper winding of relay SA. At its make contact 2 relay A operates its auxiliary slow release relay B in an obvious circuit. Relay B in operating: (1) prepares at its make contact 2 a circuit for operating thermal relay T upon a subsequent release of relay PA; (2) extends from its make contact 3 local ground to the break side of transfer contact 5 of relay SP and to make contact 1 of relay S; (3) operates relay F in a circuit from battery at the winding of relay F, via break contact 8 of relay J, conductor 40, break contacts 5 of transfer relays T2 and T1, to ground over make contact 4 of relay B; (4) prepares at its make contact 5 a circuit for operating switchboard bridged impedance battery feed relay J; and (5) operates relay SP in a circuit from ground at the make side of its transfer contact 1, through the winding of relay SP, and thence to battery, via resistor R1. The operation of relay F at this time performs no important function. Relay SP in operating: (1) connects at the make sides of its transfer contacts 1 and 4 the respective conductors 3 and 4 to respective conductors 6 and 7 via respective make contacts 1 and 3 of relay PA and respective talking capacitors C1 and C2; (2) opens at the break side of its transfer contact 2 the previously traced operating path for relay A, and, at the make side of its transfer contact 2 and its make contact 3, connects relay A under the control of the calling party in a circuit which may be traced from ground at the upper winding of relay A, over conductor 37, the break side of transfer contact 1 of relay J, ring conductor 12, make contact 3 of relay SP, ring conductor 4, the calling loop (not shown), tip conductor 3, the make side of transfer contact 2 of relay SP, tip conductor 11, the break side of transfer contact 2 of relay J, conductor 36, and thence to battery via the lower winding of relay A; (3) prepares at its make contact 6 a circuit for operating transfer relays T1 and T2 from ground at break contact 5 of relay J; (4) prepares at its make contact 7 a circuit for operating awaiting answer relay AA under the joint control of relays T1, T2, and J; and (5) at its make contact 8 reinforces the ground supplied from contact 3 of relay B. It will be noted that relay A is now supplying off-normal battery and ground toward switching center 1.

The trunk circuit is not in a condition for possible call transfer until a delay has been introduced from the initial reversal of battery and ground (answer supervision) referred to above. This is to prevent a premature "flash" (of off-normal battery and ground) due to fumbling of the switchhook (not shown) from signaling the local attendant. Thus, upon the operation of relay PA mentioned above, a circuit was closed for operating thermal relay T: circuit from ground at break contact 4 of unoperated relay T2, via break contact 4 of relay T1, the make side of transfer contact 5 of relay PA, conductor 29, break contact 6 of relay J, the break side of transfer contact 1 of thermal auxiliary relay TA, to battery via winding 35 of thermal relay T. Winding 35 is of high resistance and adapted to heat armature 26 when energized. Thermostatic bimetallic armature 26 bends when sufficiently heated to close relay T make contact 1 and to open relay T break contact 2. After an interval of time determined by the heating characteristic of relay T, that relay will operate as described. When relay T operates, it operates in turn relay TA by extending its own previously traced operating ground from its make contact 1 to relay TA. Relay TA operates and, at its transfer contact 1 locks itself operated and opens the previously traced operating path for relay T. Relay T then cools, and, after a predetermined interval, releases (bimetallic armature 26 bends to close break contact 2) to complete a circuit for operating transfer relay T1: circuit from ground at break contact 5 of relay J, via make contact 2 of operated relay TA, armature 26 of relay T, break contact 2 of relay T, conductor 32, make side of transfer contact 6 of operated relay PA, and thence to battery through the winding of relay T1. Had the off-normal battery and ground condition which operated relay PA been merely momentary due to switchhook fumble, relay PA would release at the end of the momentary off-normal interval, the relays T-TA timing interval would be interrupted, and relay T1 which prepares the trunk circuit for possible call transfer would not operate. The operate and release times of thermal relay T are not particularly critical so long as they are cumulatively longer than the expectable duration of the off-normal battery and ground condition resulting from switchhook fumble; in the exemplary trunk circuit, an operate time of 0.8 second and a release time of 2 seconds have been found satisfactory. Relay T1 in operating (1) opens at its break contact 5 the previously traced operating path for relay F, causing that relay to release; (2) opens at its break contact 4 the previously traced operating path for relays T and TA, causing the still-operated latter relay to release; and (3) completes a locking path for itself under the joint control of relays T2, SP, and J, which path may be traced from battery at the winding of relay T1, over the break side of transfer contact 3 of relay T2, make contact 3 of relay T1, make contact 6 of relay SP, and thence via conductor 34 to ground at break contact 5 of relay J. With relay T1 operated, and relays P, PA, A, B, and SP still operated, the calling and called parties may proceed with their conversation, and the trunk circuit is prepared for possible call transfer.

*Disconnect Without Transfer*

When the calling party hangs up first, the calling loop (not shown) in the previously traced operate path of relay A is opened, causing that relay to release. Relay A in releasing (1) opens at its contact 1 the inductor L holding bridge across conductors 6 and 7 toward switch train 2, and (2) at its contact 2 opens the operating circuit of slow-release relay B, permitting that relay to begin to release. Relay B eventually releases (a release time of approximately 0.3 second having been found satisfactory) and, at its contact 1, permits relay SP to lock operated to ground on conductor 8 in a circuit which may be traced from battery, via resistor R1, winding of relay SP, break side of transfer contact 1 of relay B, make side of transfer contact 5 of relay SP, and thence to ground on conductor 8. The latter provision is to permit relay SP to remain operated, holding the incoming trunk busy, until switch train 2 has released. When relay A released, opening the inductor L holding bridge, the portion of the trunk comprising conductors 6 and 7 was de-energized, and connector relay SA released, beginning in turn the release of slow release relay SB. Upon its eventual release, relay SB permits relays SK, CO, and SJ to release, permits selectors 19 and 20 and connector 21 to restore to normal, and removes ground from conductor 8, permitting trunk relay SP to release. When relay A opened the inductor L bridge aforesaid, current ceased to flow through the winding of relay P, causing that relay to release, releasing in turn relay PA. Relay PA in releasing causes the operation of relay T2 in a circuit which may be traced from ground at break contact 5 of relay J, over conductor 34, make contact 6 of operated relay SP, break contact 7 of released relay PA, make contact 2 of operated relay T1, and thence to battery via the winding of relay T2. Relay T2 operated performs no essential function at this time. Eventual release of relay SP upon the removal of ground from conductor 8 by switch train 2 (relay SB releases) causes the release of relays T1 and T2 when their previously traced operating paths are opened upon the opening of make contact 6 of relay SP. The trunk circuit is now restored to normal, no relays being operated.

When the local called party at station 13 hangs up first, switchhook contacts 22 open to open the operate path and thus cause the release of relay SJ, which at its transfer contacts 1 and 2 restores normal battery and ground to conductors 6 and 7. This is the well known "disconnect supervision." Upon the restoration aforesaid, diode D2 is again reversely biased and relay P releases, releasing in turn relay PA. Relay PA releases to operate relay T2 in the circuit described in the preceding paragraph. Relay PA released also begins the operation of relays T and TA in a circuit which may be traced from ground at make contact 2 of operated relay B, over the break side of transfer contact 5 of relay PA, conductor 29, break contact 6 of relay J, break side of transfer contact 1 of relay TA, and thence to battery via winding 35 of thermal relay T. Relays T and TA operate in the sequence previously described and serve to measure an approximately 2.8 second interval during which a restoration of off-normal battery and ground (due to the called party's again closing his switchhook contacts 22 and reoperating relay SJ) and the consequent reoperation of relays P and PA would initiate the transfer operation to be described hereinafter. Since the called party has hung up (opened contacts 22) finally in the present instance, however, thermal relay T will be permitted to complete its previously described operate and release cycle, and, at the end of this cycle, will shunt down relay SP in a circuit which may be traced from ground at break contact 5 of relay J, over make contact 2 of operated relay TA, armature 26 of relay T, break contact 2 of relay T, conductor 32, break side of transfer contact 6 of released relay PA, through the winding of relay SP, and thence again to ground at transfer contact 1 of operated relay B. Relay SP in releasing: (1) restores at its contacts 1 and 4 the originally traced connection between conductors 3 and 4 and 6 and 7 respectively, thus returning normal battery and ground from relay SA in switch train 2 to switching center 1 as a disconnect signal; (2) opens at its contacts 2 and 3 the previously traced operating path for relay A, causing that relay to release; and (3) opens at its contact 6 the previously traced operating paths of relays T1 and T2, thus causing these relays to release. Relay A in releasing opens the operate path of slow-release relay B, which in time releases to open the operate path of relay TA at its make contact 2. Relay TA releases, and the entire trunk circuit is restored to normal. Relay SA of connector 21 remains operated, and hence switch train 2 remains held, under the control of the calling party until he hangs up, opening the calling loop (not shown).

*Transfer*

When the called party at substation 13 wishes to transfer the in-dialed call to another party in the local exchanged served by switch train 2, he will summon the local attendant by momentarily depressing his switchhook (not shown) to open and reclose the line 15 loop at switchhook contacts 22, thus releasing and reoperating relay SJ to bring about a corresponding momentary reversal of battery and ground (from off-normal to normal and then back again to off-normal) on conductors 6 and 7. As discussed in the preceding section, the reversion of battery and ground to normal will bring about the release of relays P and PA, the operation of relay T2 from ground at break contact 7 of released relay PA, and begin the timing cycle of relays T and TA. When the called party permits his switchhook contacts 22 to reclose at the end of the momentary interval and before the end of the 2.8 second timing interval, the return to off-normal battery and ground on conductors 6 and 7 will cause relays P and PA to reoperate in their operating circuits previously referred to. Relay PA in operating: (1) opens at its contact 5 the previously described operating circuit for relays T and TA, restoring these relays to their normal unoperated condition; (2) and opens at its contact 8 the operating path for relay T1, causing that relay to release. With relay T2 operated and relay T1 released, relay AA operates: circuit from battery through the winding of awaiting answer relay AA, over conductor 42, break contact 9 of relay J, conductor 41, make contact 6 of relay T2, break contact 6 of relay T1, and thence to ground at make contact 7 of relay SP. Relay AA operated: (1) lights trunk lamp TL from battery at its make contact 1 via break contact 2 of sleeve relay S; (2) applies ground from its make contact 2 to begin the operation of ringing current source 14; (3) connects ringing current from source 14 via its contact 3 and capacitor C5 to ring conductor 4 via conductor 37, the break side of transfer contact 1 of relay J, ring conductor 12, and make contact 3 of relay SP, and to ring conductor 7 from contact 3 of relay SP aforesaid, via the make side of transfer contact 4 of relay SP, capacitor C2, and make contact 3 of relay PA; and (4) locks operated via its contact 4 and to ground at contact 7 of relay SP independent of relay T1. The calling and called parties are thus audibly apprised of the fact that the attendant is being alerted. In addition to trunk lamp TL, a ringing device may also be provided for signaling purposes at the attendant position, in which case ringing current from source 14 would be extended thereto also. At this point in the transfer operation, trunk relays P, PA, A, B, SP, T2, and AA are operated.

When the attendant responds to the lighted condition of lamp TL, she will insert her cord circuit 16 into trunk jack TJ, thereby operating sleeve relay S in an obvious circuit from ground at jack contact 3, and thereby also operating bridged impedance battery feed relay J from the resistor 25 bridge thus placed across conductors 9 and 10: the operating circuit for relay J is from ground through the lower winding of relay J, over tip conductor 9, contact 1 of jack TJ, the attendant's cord bridge 25, contact 2 of jack TJ, ring conductor 10, make contact 5 of relay B, break contact 1 of relay T1, conductor 38, and thence to battery through the upper winding of relay J. Relay S in operating: (1) opens at its break contact 2 the previously traced lighting circuit for lamp TL, and (2) connects at its make contact 1 the sleeve of jack TJ to ground at contact 3 of relay B via resistor R2. Relay J in operating: (1) opens at its contact 9 the previously traced operating circuit for relay AA, thereby causing the latter relay to release, disconnecting ringing current from the talking connection; (2) opens at its contact 5 the previously traced operating path for relay T2, causing that relay to release; and (3) connects attendant's cord circuit 16 into the talking connection in a circuit which may be traced from tip conductor 3, via the make side of contact 2 of relay SP, tip conductor 11, make side of contact 2 of relay J, break side of contact 1 of unoperated relay F, make contact 3 of relay J, capacitor C3, tip conductor 9, contact 1 of jack TJ, resistor 25 in attendant's cord circuit 16, contact 2 of jack TJ, ring conductor 10, capacitor C4, make contact 4 of relay J, break side of contact 2 of relay F, make side of contact 1 of relay J, ring conductor 12, make contact 3 of relay SP, and thence to ring conductor 4. The attendant, and the calling and called parties are now in talking relation, and trunk circuit relays P, PA, A, B, SP, S, and J are operated. The calling or called party may now ask the attendant to join any desired local party to the connection, which she may do using the other end of her cord 16 (not shown). The addition of the new party does not alter the condition of the trunk circuit.

*Disconnect After Transfer*

After the transfer is effected, the attendant or either of the calling and called parties may be the first to disconnect.

When the attendant is the first to disconnect, she will remove her cord circuit 16 from trunk jack TJ, thus opening the previously traced operating paths for, and causing the release of, relays J and S. Relay J upon releasing closes at its contact 6 the previously traced operating path for relays T and TA, causing these relays to begin their 2.8 second timing cycle. Upon the completion of the cycle aforesaid, relay T1 will operate in a circuit from ground at contact 5 of relay J, over make contact 2 of relay TA, armature 26 of relay T, break contact 2 of relay T, conductor 32, make side of transfer contact 6 of relay PA, and thence to battery through the winding of relay T1. Relay T1 in operating opens at its contact 4 the operate path of relay TA, thus causing that relay to release, and the trunk circuit is once again in the condition it was in just after the called party had answered the in-dialed call originally: relays P, PA, A, B, SP, and T1 are operated. The called party may henceforth initiate another transfer in the manner previously described.

If, after disconnecting, the attendant replugs into the connection without having been called, the reinsertion of her cord circuit 16 into trunk jack TJ will reoperate relay J in its previously traced operating circuit. Relay J operated will then release, by opening its contacts 5 and 6, any one or more of the relays T, TA, and T1 which may at that time be operated. If the attendant does not replug, subsequent disconnection by the called and calling parties will be as described previously in the section "Disconnect Without Transfer."

When the called party is the first to disconnect, switch train 2 restores normal battery and ground to conductors 6 and 7, bringing about the release of relays P and PA as previously described. With relay J operated, relay PA released opens at its contact 2 the inductor L bridge toward switch train 2, thereby permitting switch train 2 to restore to an idle condition as previously described. The called party at station 13 may now receive or initiate calls at will, and the trunk circuit remains held under the control of the calling party by virtue of his control over the operating path of relay A.

When the attendant next disconnects after the called party, relays S and J will release, and relay J released will initiate the timing cycle of relays T and TA as previously described. At the end of this timing cycle relay SP will be shunted down, also as previously described. Upon the release of relay SP: (1) conductors 3 and 4 are reconnected to conductors 6 and 7 respectively, the normal battery and ground on the latter conductors from first selector 19 as previously described thus being returned to distant center 1 as a disconnect signal; (2) the operating circuit for relay A is opened at contacts 2 and 3 of relay SP. Relay A in releasing brings about the release of relay B, which in turn, at its make contact 2, opens the operating path for relay TA. All trunk circuit relays are now released.

When the calling party next disconnects after the called party, the previously traced operating path for relay A is opened, causing that relay to release, and to release in turn relays B and SP as previously described. Relay B also, at its contact 5, opens the previously traced operating path for relay J. Relay SP in releasing reconnects conductors 3 and 4 through to switch train 2. Should the trunk circuit be reseized at switching center 1 before the attendant has withdrawn her cord circuit 16 from jack TJ, no obstacle will be presented to in-dialing.

When the calling party is the first to disconnect, relay A releases, releasing in turn relays B and SP as previously described. Relays P and PA release in consequence of the opening of the inductor L bridges by relay A. Relay B releases to open the previously traced operating path of relay J, causing that relay to release. The trunk circuit thus assumes a condition where only relay S remains operated (from contact 3 of trunk jack TJ), and when the attendant removes her cord circuit 16, the trunk circuit restores to normal. It will be noted that relay S operated will not interfere with seizure of and in-dialing another call over the trunk circuit.

*Signaling the Toll Operator*

Instead of a call being directly in-dialed to a PBX called party by the interested calling party, such a call may be in-dialed for the calling party by a toll operator located at a toll point such as toll switching center 5. In the disclosed embodiment, for example, the toll operator may extend a connection from the calling party appearing at calling jack CJ to the called party at station 13 in FIG. 2 via her cord circuit 23, outgoing jack OJ, toll switching trunk repeater 30, trunk conductors 17 and 18, tandem switching center 1, and thereafter via conductors 3 and 4 as previously described. The "dialing" by the toll operator will most generally take the form of keying the called number into an outgoing sender, which will in turn transmit digit representative signals to tandem center 1 by placing them across capacitor 31 in repeater 30; any well-known form of telephone signaling may be used between switching centers 5 and 1, and tandem center 1, recognizing that switch train 2 is adapted to receive only dial pulses, will transmit the latter over conductors 3 and 4, all as is well known in the art. Reverse battery supervisory signaling, representative of such conditions as called party answer, disconnect, and recall, will be repeated from conductors 3 and 4 to corresponding conductors 17 and 18 by tandem center 1; polar toll supervisory relay TS will be operated or released according to the polarity of battery and ground on conductors 17 and 18, and will light supervisory lamp SL when operated. Thus, it may be assumed here that normal battery and ground on conductors 17 and 18 will operate relay TS, that off-normal battery and ground (answer supervision) appearing on conductors 3 and 4 when the called party answers will be repeated by tandem center 1 to cause the release of relay TS and the consequent extinguishment of lamp SL, that a subsequent persistent appearance of normal battery and ground (disconnect supervision) on conductors 3 and 4 when the called party hangs up will be repeated by tandem center 1 to cause the persistent reoperation of relay TS and the consequent relighting of lamp TS, and, finally, that a momentary appearance of normal battery and ground (recall signal) on conductors 3 and 4 will bring about a corresponding momentary flash of lamp SL due to the repetition aforesaid.

On such calls as are forwarded by the toll operator in the foregoing manner, a called party is ordinarily able to effect her recall simply by momentarily depressing his switchhook a number of times, causing her supervisory lamp to flash. In the arrangement under consideration, however, momentary switchhook depressions by the called party at station 13 in FIG. 2 are used to effect call transfer in the manner previously described, and the consequent momentary appearances of normal battery and ground are not transmitted back to the toll operator in order to avoid recalling her needlessly. Means comprising the J and F trunk relays of FIG. 2 and circuitry associated therewith has been provided, therefore, whereby the local PBX attendant having cord circuit 16 may recall the toll operator at the behest of the called party.

When the called party at station 13 wishes to recall the toll operator, he will momentarily depress his switchhook (not shown), thereby initiating the previously described circuit operations which result in signaling the local PBX attendant by lighting trunk lamp TL. When the attendant responds by inserting her cord circuit 16 into jack TJ, relays S and J will operate as described hereinbefore, and the operated relays in the trunk circuit will be P, PA, A, B, SP, S, and J. When informed by the party at station 13 that communication with the toll operator is desired, the PBX attendant will proceed to withdraw her cord circuit 16 from and reinsert it into jack TJ a number of times. The latter sequence of withdrawals and reinsertions causes the toll operator's lamp SL to flash as described in the following paragraph.

Before relay J operated upon the insertion of cord circuit 16 (relays J and F released), bridged impedance battery feed relay A supplied off-normal battery and ground toward tandem center 1 in a circuit which may be traced from ground at the upper winding of relay A, over conductor 37, the break side of transfer contact 1 of relay J, ring conductor 12, and make contact 3 of relay SP to ring conductor 4, and from battery at the lower winding of relay A, over conductor 36, the break side of transfer contact 2 of relay J, tip conductor 11, and the make side of transfer contact 2 of relay SP to tip conductor 3. This off-normal battery and ground condition will be extended to tip and ring conductors 17 and 18 by tandem center 1, and those conductors will thus be of such polarity as to maintain relay TS unoperated and, consequently, lamp SL extinguished. Upon the operation of relay J when the PBX attendant first responds to the lighting of lamp TL (relay J operated; relay F released), relay A continues to supply off-normal battery and ground toward tandem center 1 in a circuit which may be traced from ground at the upper winding of relay A, over conductor 37, the break side of transfer contact 2 of relay F, make side of transfer contact 1 of relay J, ring conductor 12, and make contact 3 of relay SP to ring conductor 4, and from battery at the lower winding of relay A, over conductor 36, the break side of transfer contact 1 of relay F, make side of transfer contact 2 of relay J, tip conductor 11, and the make side of transfer contact 2 of relay SP to tip conductor 3. Since off-normal battery and ground is still on conductors 3 and 4, relay TS remains unoperated and lamp SL remains dark. When the PBX attendant first withdraws her cord circuit 16 from trunk jack TJ, the previously traced operating path for relay J is opened, and the latter relay releases to operate relay F in a circuit which may be traced from ground at make contact 4 of relay B, over break contacts 5 of relays T1 and T2, conductor 40, break contact 8 of relay J, and thence to battery via the winding of relay F. With this first withdrawal of cord circuit 16 by the PBX attendant (relay J released; relay F operated), relay A continues to supply off-normal battery and ground toward tandem center 1, the circuit being the same as that traced at the beginning of this paragraph for the condition obtaining when both relays J and F are released; consequently, relay TS remains unoperated and lamp SL dark as before. When the PBX attendant reinserts cord circuit 16 into jack TJ, relay J will reoperate in its previously traced operating path, and, in operating, open at its contact 8 the previously traced operating path for slow release relay F, thus beginning the release of the latter relay. In the momentary interval during which relay J is operated and relay F is operated while releasing, relay A supplies normal battery and ground toward tandem center 1 in a circuit which may be traced from ground at the upper winding of relay A, over conductor 37, the make side of transfer contact 2 of relay F, make side of transfer contact 2 of relay J, tip conductor 11, and the make side of transfer contact 2 of relay SP to tip conductor 3, and from battery at the lower winding of relay A, over conductor 36, the make side of transfer contact 1 of relay F, make side of transfer contact 1 of relay J, ring conductor 12, and make contact 3 of relay SP to ring conductor 4. This change from off-normal to normal battery and ground on conductors 3 and 4 is repeated by tandem center 1 to conductors 17 and 18, bringing about the operation of polar relay TS during the relay F release interval, and a consequent momentary illumination of trunk supervisory lamp SL. When slow release relay F finally releases, battery and ground supplied to conductors 3 and 4, and hence to conductors 17 and 18, reverts to normal as in the previously described circuit for the condition obtaining when relay J is operated and relay F released; relay TS releases in consequence of this reversion and lamp SL is extinguished. Subsequent withdrawals and reinsertions of cord circuit 16 will cause the momentary reversal aforesaid to be repeated, thus flashing toll supervisory lamp SL to alert the toll operator.

In the preceding signaling sequence, and at the time relay J is released upon the withdrawal of cord circuit 16 by the local PBX attendant, a circuit is completed which begins the operation of the timing relays T and TA such as was described under "Disconnect After Transfer" in the second paragraph of that section. If the attendant does not replug within the interval timed by relays T and TA, the there described operation of relay T1 will take place, and relay T1 in operating will open at its contact 5 the previously traced operating path for relay F, disabling the J–F signaling combination. The trunk circuit can thus distinguish between attendant signaling and disconnect.

It is to be understood that the above-described arrangement is merely illustrative of the application of the principles of the invention; numerous other arrangements may be devised by those skilled in the art without departing from the spirit and scope of the invention.

What is claimed is:

1. In combination, a telephone circuit, an energy source, first and second operable and releasable circuit controlling elements effective when both are released to connect said source to said circuit in a first manner, said second element having a slow release characteristic, means effective upon the operation of only said first element to maintain said first manner of connection, means effective upon the subsequent release of said first element to operate said second element and to further maintain said first manner of connection, and means effective upon the subsequent operation of said first element to begin the release of said second element and to connect said source to said circuit in a second manner.

2. The invention defined in claim 1 wherein is provided timing means operative under the control of said first element to measure a predetermined interval beginning with the said subsequent release of said first element.

3. The invention defined in claim 2 wherein said timing means is operative to begin the release of said second element at the end of said predetermined interval, and wherein said timing means is rendered inoperative under the control of said first element upon the said subsequent operation of said first element within said predetermined interval.

4. In combination, a telephone circuit, a signaling circuit comprising first and second initially released relays and first contact means controlled thereby, an energy source connected to said telephone circuit via said first contact means and having a normal electrical potential relation to said telephone circuit when both of said relays are released, means effective to operate and to release said first relay, circuit means in said signaling circuit comprising second contact means effective in response to the operation of said first relay to maintain said normal relation and to prevent said second relay from operating, said signaling circuit also comprising means effective upon the subsequent release of said first relay to maintain said normal relation and to operate said second relay, said circuit means further comprising third contact means effective upon the subsequent reoperation of said first relay to begin a delayed release of said second relay and to change said normal relation during the time both said relays are operated.

5. The invention defined in claim 4 wherein said second relay comprises a slow release relay and wherein means are provided for operating said slow release relay under the control of said first relay.

6. The invention defined in claim 4 wherein said first contact means comprises first break contacts of said first relay, wherein said second contact means comprises second break contacts of said first relay and break contacts of said second relay, and wherein said third contact means comprises make contacts of said first and second relays.

7. In a telephone system, a main exchange, a branch exchange, a trunk circuit having a terminus at said main exchange and having first and second termini at said branch exchange, said circuit being effective to convey signals from said main exchange terminus to said first terminus when a first potential condition obtains at said first terminus, energy source means in said circuit effective in response to a second potential condition obtaining at said first terminus to supply said second potential condition to said main exchange terminus, transfer means in said circuit effective in response to a momentary change from said second potential condition to said first condition at said first terminus to prepare for connecting said second terminus to said first and said main exchange termini, and signaling means in said circuit controllable from said second terminus for connecting said second terminus to said first and said main exchange termini and for causing said source means to momentarily supply said first potential condition to said main exchange terminus.

8. The invention claimed in claim 7 wherein said signaling means comprises first relay means and second slow release relay means, and wherein said relay means are operable and releasable through their four permutations of operation and release to cause said source means to supply a said second condition during three of said permutations and a said first condition during the remaining one of said permutations.

9. The invention claimed in claim 8 wherein said permutations occur sequentially, wherein said remaining one of said permutations occurs last in said sequence, wherein is provided timing means operable by said first relay means to measure a predetermined interval upon the assumption by said relay means of the permutation preceding said remaining one, and wherein said timing means is effective to inhibit the assumption by said relay means of the said remaining permutation when said relay means are in the said preceding permutation at the end of said interval.

10. The invention claimed in claim 7 wherein said branch exchange comprises an automatic switch train and an attendant position, wherein said first terminus is at said switch train, wherein said second terminus is at said attendant position, and wherein said attendant position comprises apparatus actuable by an attendant for controlling said signaling means.

11. A signaling arrangement comprising a signaling channel, a source of electrical energy, two dual condition switching devices controllable to assume any one of four different pairs of conditions, circuitry interconnecting said source with said channel and selectively controlled by said devices to connect said source to said channel in a manner particular to each different pair of conditions, means for controlling said devices to cause same to assume said four pairs of conditions one at a time in a prescribed sequence, and timing means controlled by said devices upon their assumption of one of said pairs of conditions to measure a predetermined interval, said timing means being effective under the control of said devices to interrupt said prescribed sequence when said controlling means causes said devices to remain in said one pair of conditions beyond the end of said predetermined interval.

12. The invention defined in claim 11 wherein said source supplies two different potentials, and wherein said circuitry comprises circuit completing and circuit interrupting elements controlled by said devices to connect said source to said channel in the same polarity when said devices assume three of said four pairs of conditions.

13. The invention defined in claim 12 wherein said three pairs of conditions are assumed in said prescribed sequence before the remaining one of said four pairs of conditions is assumed, wherein said devices are relays, wherein one of said relays is a slow-release relay, wherein the polarity of the connection of said source to said channel is opposite to said same polarity during said remaining one of said pairs of conditions and wherein said remaining pair of conditions persists for the duration of the release of said slow-release relay.

14. A telephone signaling arrangement comprising a telephone circuit including first and second signaling conductors, a source of two different electrical potentials representing a normal sense thereof when one of said potentials is connected to said first conductor and the other of said potentials is connected to said second conductor and representing a reverse sense when said one potential is connected to said second conductor and said other potential is connected to said first conductor, two switching devices operable and releasable to assume any one of four different pairs of operated-released conditions, circuitry interconnecting said source with said signaling conductors and selectively controllable by said devices to connect said potentials to said conductors in a sense thereof particular to each different pair of conditions, means for operating and releasing said devices to cause same to assume said four pairs of conditions one at a time in a prescribed sequence, timing means controlled by one of said devices upon the assumption of a particular one of said pairs of conditions to measure a predetermined interval, said timing means effective under control of said devices to inhibit said devices from assuming a succeeding one of said pairs of conditions in said prescribed sequence when said operating and releasing means causes said devices to remain in said particular one pair of conditions beyond the end of said predetermined interval, and wherein said particular one pair of conditions occurs penultimately in said prescribed sequence of said four pairs of conditions.

15. The invention defined in claim 14 wherein said four pairs of conditions comprise a first, a second, a third, and a fourth pair of conditions which said devices are caused to assume in that order by said means for operating and releasing, and wherein said circuitry comprises circuit completing and circuit interrupting elements controlled by said devices for connecting said potentials to said conductors in a sense thereof particular to each of said pairs of conditions.

16. The invention defined in claim 15 wherein one of said devices is a first relay, wherein the other of said devices is a slow-release relay, wherein is provided an operate path for said slow-release relay, wherein said operate path comprises a said interrupting element of the said first relay, and wherein said fourth pair of conditions persists for an interval of time as measured by the release time of said slow-release relay.

17. An interexchange telephone signaling arrangement comprising a main exchange; a branch exchange including a telephone station and an attendant position having signaling means; an interexchange trunk circuit having first and second signaling conductors terminating at said main exchange and having first and second termini at said branch exchange, said first terminus comprising means whereby a connection can be extended from said main exchange over said trunk circuit and into said branch exchange and to said station, said second terminus comprising means whereby an attendant can secure access to said trunk circuit; said branch exchange including a first source of two different electrical potentials connectable to said signaling conductors and representing a normal sense thereof when one of said first source potentials is connected to said first conductor and the other of said first source potentials is connected to said second conductor and representing a reverse sense thereof when said other first source potential is connected to said first conductor and said one first source potential is connected to said second conductor, said branch exchange also including means controllable by said station for applying said first source potentials to said first terminus in said normal sense to indicate an on-hook station and in said reverse sense to indicate an off-hook station; said trunk circuit including a second source of two different electrical potentials connectable to said signaling conductors and representing a normal sense thereof when one of said second source potentials is connected to said first conductor and said other second source potential is connected to said second conductor and representing a reverse sense thereof when said one second source potential is connected to said second conductor and said other second source potential is connected to said first conductor, said trunk circuit also including a switching arrangement controllable from said first and second termini for applying said second source potentials over said conductors to said main terminus at times in said normal sense and at times in said reverse sense; said switching arrangement comprising two switching devices operable and releasable to assume any one of four different pairs of operated-released conditions, circuitry interconnecting said second source with said main terminus and selectively controllable by said devices to connect said potentials over said conductors to said main terminus in one of said two senses particular to each different pair of conditions, means responsive to an initial reverse sense first source potential condition at said first terminus for causing said devices to maintain a first pair of conditions whereby said second source is connected over said conductors to said main terminus in said reverse sense, means responsive to a subsequent momentary change at said first terminus of said first source potential condition from its reverse sense to its normal sense and back to its reverse sense to alert the attendant without affecting the reverse sense of said second source then applied to said main terminus, and means under the control of the attendant signaling means via said second terminus for causing said devices to sequentially assume the other three pairs of conditions one at a time in a prescribed order, whereby said second source potentials are connected over said conductors to said main terminus in senses corresponding to said prescribed sequence of pairs of conditions.

18. The invention defined in claim 17 wherein said trunk circuit is provided with timing means controlled by said switching device upon their assumption of one of the said pairs of conditions to measure a predetermined interval, and wherein said timing means is effective under the control of said devices to interrupt said prescribed sequence when said means under the control of the attendant signaling means causes said devices to remain in said one pair of conditions beyond the end of said predetermined interval.

19. The invention defined in claim 17 wherein said interconnecting circuitry comprises circuit completing and circuit interrupting elements so arranged and controlled by said devices as to cause the application of the potentials of said second source to said main terminus to remain in said reverse sense during the assumption by said devices of three of said four pairs of conditions and to cause the application of the potentials of said second source to said main terminus to revert momentarily to said normal sense during the assumption by said devices of the remaining pair of conditions.

20. The invention defined in claim 19 wherein said three pairs of conditions are assumed in said prescribed sequence before the said remaining pair of conditions is assumed, wherein said devices are relays, wherein one of said devices is a slow-release relay, and wherein said remaining pair of conditions persists only for the duration of the release of said slow-release relay.

21. A telephone system comprising a first switching center including an operator position, a private branch exchange switching center including an attendant position and a subscriber line, means including a trunk circuit for interconnecting said operator position and said line, means including said line and said trunk circuit for flashing said attendant position, means in said trunk circuit for preventing said latter means from flashing said operator position, and means in said trunk circuit under the joint control of said flashing means and said attendant position for flashing said operator position, said latter means comprising a relay signaling circuit.

22. A telephone system as defined in claim 21 wherein said relay signaling circuit comprises first and second relays enabled by said means for flashing said attendant position and controllable from said attendant position through their four permutations of operation and release to flash said operator position.

23. A telephone system as defined in claim 22 wherein said attendant position comprises means for connecting to and disconnecting from said trunk, and wherein said trunk circuit comprises means for distinguishing between flashing said operator position and disconnect.

24. A telephone system as defined in claim 23 wherein said trunk circuit comprises energy supplying means, and wherein said supplying means is connectable toward said operator position by said relays in opposing senses to effect said flashing of said operator position.

25. A telephone system as defined in claim 24 wherein said relays are advanced through their said four permutations sequentially, wherein said supplying means is connected to said trunk circuit in one sense during the first three of said permutations and in the opposing sense during the fourth of said permutations, wherein said distinguishing means includes timing means, wherein said timing means is effective upon the assumption by said relays of the third of said permutations to measure a predetermined interval of time, and wherein said timing means is effective upon the failure of said relays to assume said fourth permutation during said interval to inhibit the assumption by said relays of said latter permutation.

References Cited in the file of this patent

UNITED STATES PATENTS

| | | |
|---|---|---|
| 2,805,288 | Fisher | Sept. 3, 1957 |
| 2,915,591 | Pedrick | Dec. 1, 1959 |
| 2,976,368 | Gray | Mar. 21, 1961 |